(12) United States Patent
Tsuchiya et al.

(10) Patent No.: US 8,264,324 B2
(45) Date of Patent: Sep. 11, 2012

(54) KEYLESS DEVICE OF VEHICLE

(75) Inventors: Nobuaki Tsuchiya, Kita-ku (JP); Takashi Otsuka, Kita-ku (JP)

(73) Assignee: Calsonic Kansei Corporation, Saitama-ken (JP)

( * ) Notice: Subject to any disclaimer, the term of this patent is extended or adjusted under 35 U.S.C. 154(b) by 754 days.

(21) Appl. No.: 12/309,031

(22) PCT Filed: Jun. 26, 2007

(86) PCT No.: PCT/JP2007/062767
§ 371 (c)(1),
(2), (4) Date: Jan. 5, 2009

(87) PCT Pub. No.: WO2008/004459
PCT Pub. Date: Jan. 10, 2008

(65) Prior Publication Data
US 2009/0289759 A1  Nov. 26, 2009

(30) Foreign Application Priority Data

Jul. 6, 2006 (JP) ................................. 2006-186263

(51) Int. Cl.
*B60R 25/00* (2006.01)
(52) U.S. Cl. .................. 340/5.72; 340/426.36
(58) Field of Classification Search .................. None
See application file for complete search history.

(56) References Cited

U.S. PATENT DOCUMENTS

| 6,208,239 | B1 * | 3/2001 | Muller et al. ............ 340/426.35 |
| 6,538,559 | B1 * | 3/2003 | Okada ........................ 340/5.72 |
| 6,621,178 | B2 * | 9/2003 | Morillon ...................... 307/10.5 |
| 2002/0033752 | A1 * | 3/2002 | Greenwood et al. ......... 340/5.61 |
| 2004/0073340 | A1 * | 4/2004 | Ueda et al. ........................ 701/2 |
| 2004/0142732 | A1 | 7/2004 | Ueda et al. |

FOREIGN PATENT DOCUMENTS

| JE | 2003-106019 | 4/2003 |
| JP | 2000-145226 | 5/2000 |
| JP | 2003-201784 | 7/2003 |
| JP | 2004-131974 | 4/2004 |
| JP | 2004-132028 | 4/2004 |
| JP | 2005-112177 | 4/2005 |
| JP | 2006-013799 | 1/2006 |
| JP | 2006-125098 | 5/2006 |
| JP | 2006-249828 | 9/2006 |

OTHER PUBLICATIONS

International Search Report mailed Sep. 18, 2007 for International Application No. PCT/JP2007/062767.

\* cited by examiner

*Primary Examiner* — Jennifer Mehmood
*Assistant Examiner* — Brian Wilson
(74) *Attorney, Agent, or Firm* — Wenderoth Lind & Ponack, L.L.P.

(57) ABSTRACT

A keyless device of a vehicle changes a search area "A" of a vehicle exterior antenna to a search area "A2" that is smaller than a normal area "A1", and sets an overlapped area of a search area "B" of a vehicle exterior antenna and a normal search area "B1" to correspond only to an interior of the vehicle.

6 Claims, 6 Drawing Sheets

KEYLESS DEVICE OF VEHICLE

TECHNICAL FIELD

The present invention belongs to technology of a keyless device of a vehicle that can lock and unlock a door lock of a vehicle and start an engine of the vehicle according to a position of a portable device relative to the vehicle.

BACKGROUND OF THE INVENTION

Such a technology is disclosed in Japanese Patent Application Laid-Open Publication No. 2006-125098. This conventional keyless device of a vehicle has a vehicle interior transmitting antenna that transmits an answer request signal to an interior of the vehicle, and a vehicle exterior transmitting antenna that transmits an answer request signal to an exterior of the vehicle. When a door operator, such as a driver, approaches the vehicle with a portable device to enter a vehicle exterior detection area and touches an outer door handle, an identification verification routine signal is sent to a main electric control unit (ECU), the vehicle-interior transmitting antenna and the vehicle-exterior transmitting antenna transmit the answer request signals. When these signals are received by the portable device, the portable device sends information on a specific identification (ID). The information is received through the vehicle exterior transmitting antenna by the main ECU, and all of door locks are released when the main ECU verifies the coincidence with the ID codes.

When the driver opens a door to ride in the vehicle and pushes an ignition knob, the portable device and the main ECU verify the coincidence of the ID code through the vehicle exterior transmitting antenna. The coincidence of the ID codes being verified, a rotational operation of the ignition knob causes the engine to start without using a mechanical key.

The conventional keyless device, however, has a problem in that, in a case where the vehicle interior antenna malfunctions, the driver cannot start the engine by operating the ignition knob, because the existence of the driver with the portable device cannot be detected in the interior of the vehicle.

The present invention is made to solve the above-described problem, and its object is to provide a keyless device of a vehicle that can detect a portable device that is located in an interior of the vehicle in a case where a malfunction occurs in a vehicle interior antenna for transmitting an answer request signal to the portable located in the interior of the vehicle.

SUMMARY OF THE INVENTION

According to a first aspect of the present invention there is provided a keyless device of a vehicle including an on-vehicle device provided with a plurality of search signal transmitting means that each transmits a search signal to an interior and an exterior of the vehicle to search a portable device and with an answer signal receiving means that receives an answer signal replied to the search signal by the portable device; a portable device provided with a search signal receiving means for receiving the search signal and an answer signal transmitting means for transmitting the answer signal; a position detecting means that is capable of detecting based on the answer signal that the portable device is within a search area where the search signal transmitting means can search the portable device; and a search area setting means that is capable of setting the search areas in such a way that a first search area of a first search signal transmitting means and a second search area of a second search signal transmitting means differ in area from each other and an overlapped area of the first and second search area corresponds only to the interior of the vehicle.

According to the keyless device of the present invention, the portable device in a passenger compartment can be detected in a case where the vehicle interior transmitting antenna, which transmits the search signal for searching the portable device to the interior of the vehicle, is broken down.

BRIEF DESCRIPTION OF THE DRAWINGS

The objects, features and advantages of the present invention will become apparent as the description proceeds when taken in conjunction with the accompanying drawings, in which.

DESCRIPTION OF REFERENCE NUMBERS

Figure 1:
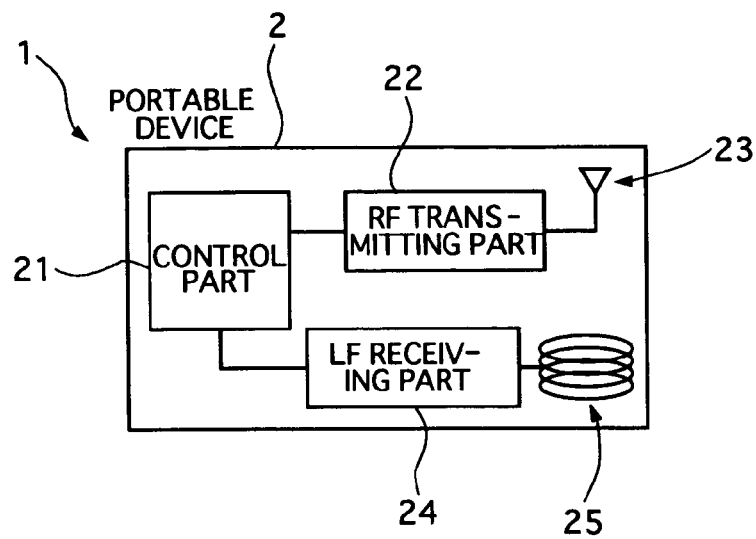
FIG. 1 is a diagram showing a portable device and an on-vehicle device that constitute a keyless device of a vehicle of a first embodiment according to the present invention.
Figure 1:
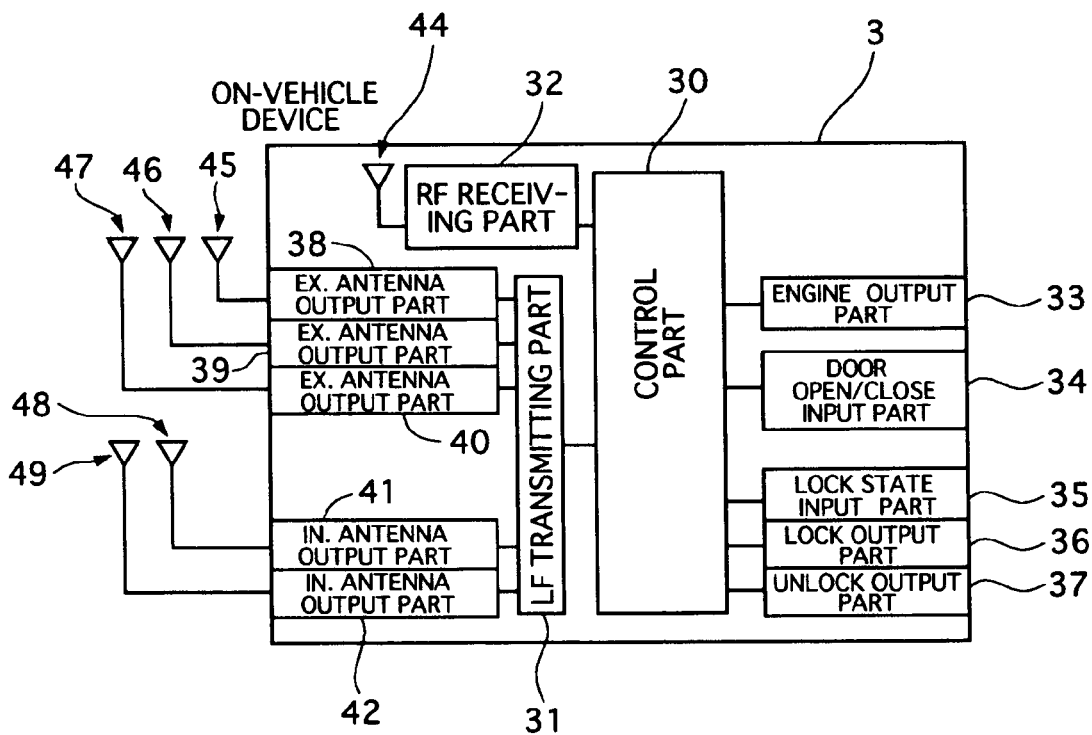

1 keyless device of a vehicle
2 portable device
3 on-vehicle device
21 control part
23 answer signal transmitting antenna
25 search signal receiving coil
30 control part
44 answer signal receiving antenna
45-47 vehicle exterior antenna
48, 49 vehicle interior antenna

DETAILED DESCRIPTION OF THE INVENTION

[First Embodiment]

Hereinafter, two embodiments to realize a keyless device of a vehicle of the present invention will be described.

Throughout the following detailed description, similar reference characters and numbers refer to similar elements in all figures of the drawings, and their descriptions are omitted for eliminating duplication.

[First Embodiment]

First, a construction of a keyless device of a vehicle of a first embodiment will be described.

As shown in FIG. 1, the keyless device 1 of the vehicle of the first embodiment mainly includes a portable device 2 and an on-vehicle device 3.

<Portable Device>

The portable device 2 mainly has a control part 21, a radio frequency (RF) transmitting part 22, an answer signal transmitting antenna 23, a low frequency (LF) receiving part 24 and a search signal receiving coil 25.

Incidentally, the answer signal transmitting antenna 23 corresponds to an answer signal transmitting means of the present invention, and the search signal receiving coil 25 corresponds to a search signal receiving means of the present invention.

The control part 21 outputs a command signal to the RF transmitting part 22 so that it outputs an answer signal, when the portable device 2 receives a search signal (or search signals) outputted from antennas 45 to 49 of the on-vehicle device 3. In this operation, the portable device 2 stores an identification (ID) code that identifies the vehicle from other vehicles. In a case where the control part 21 judges that the search signal processed by the LF receiving unit 24 is consistent with the ID code stored in the portable device 2, the control part 21 outputs the ID code to the RF transmitting part 22.

In addition, the control part 21 judges based on the information contained in the search signal which of the search signal transmitting antennas 38 to 42 of the on-vehicle device 3 transmits the search signal, and then it outputs the information on the antenna/antennas transmitting the search signal(s), to the RF transmitting part 22.

Further, the control part 21 determines a receiving intensity of the search signal to output the intensity to the RF transmitting part 22.

The RF transmitting part 22 converts the ID code, the information on the antenna/antennas transmitting the search signal(s) and the receiving intensity/intensities of the search signal(s) into a radio frequency signal, and then it outputs the radio frequency signal to the answer signal transmitting antenna 23.

The answer signal transmitting antenna 23 transmits the radio frequency signal outputted from the RF transmitting part 22.

The LF receiving part 24 converts the search signal(s) received by the search signal receiving coil 25 into a signal that the control part 21 can process, and then it outputs the signal to the control part 21.

The search signal receiving coil 25 receives the search signal(s) outputted from the on-vehicle device 3 to output it to the LF receiving part 24.

<On-Vehicle Device>

The on-vehicle device 3 mainly includes a control part 30, an LF transmitting part 31, an RF receiving part 32, an engine output part 33, door open/close input parts 34, a lock-state input part 35, a lock output part 36, an unlock output part 37, vehicle exterior antenna output parts 38 to 40, vehicle interior antenna output parts 41 and 42, an answer signal receiving antenna 44, the vehicle exterior antennas 45 to 47 and the vehicle interior antennas 48 and 49.

Incidentally, the control part 30 corresponds to a position detecting means of the present invention, the answer signal receiving antenna 44 corresponds to an answer signal receiving means of the present invention, the vehicle exterior antennas 45 to 47 correspond to a search signal transmitting means of the present invention, and the vehicle interior antennas 48 and 40 correspond to a vehicle interior search signal transmitting means of the present invention.

The control part 30 controls an output to be sent to the LF transmitting part 31 and outputs to be respectively sent to the lock output part 36 and the unlock output part 37, after the control part 30 processes the information inputted from the door open/close input part 34 and the lock state input part 35 and the information inputted from the portable device 2 through the RF receiving part 32.

The LF transmitting part 31 converts the search signal for searching the particular portable device 2 corresponding to the vehicle into a transmittable radio wave signal, and then it outputs the radio wave signal to the vehicle exterior antenna output parts 38 to 40 and the vehicle interior antenna output parts 41 and 42.

The RF receiving part 32 receives the radio wave signal, which indicates the ID code of the portable device 2, the antenna information and the receiving intensity, through the answer signal receiving antenna 44. The RF receiving part 32 converts them into a signal that can be processed by the control part 30, and then it outputs the signal.

The engine output part 33 outputs a command signal for starting a not-shown engine according to a start command outputted from the control part 30.

The door open/close input parts 34 are inputted with the information on open/close states of not-shown doors of the vehicle from the vehicle, and then it outputs the information to the control part 30.

The lock state input part 35 is inputted with information on lock/unlock states of not-shown door locks of the vehicle from the vehicle, and then it outputs the information to the control part 30.

The lock output part 36 outputs a command signal for locking the door locks to the door locks according to a lock command outputted from the control part 30.

The unlock output part 37 outputs a command signal for releasing the door locks to the door locks according to an unlock command outputted from the control part 30.

The vehicle exterior antenna output parts 38 to 40 output the radio wave signal to the vehicle exterior antennas 45 to 47, and then the vehicle exterior antennas 45 to 47 transmit the radio wave signals to the exterior of the vehicle.

The vehicle interior antenna output parts 41 and 42 output the radio wave signal to the vehicle interior antennas 48 and 49, and then the vehicle interior antennas 48 and 49 transmit the radio wave signals to the interior of the vehicle.

Figure 2:
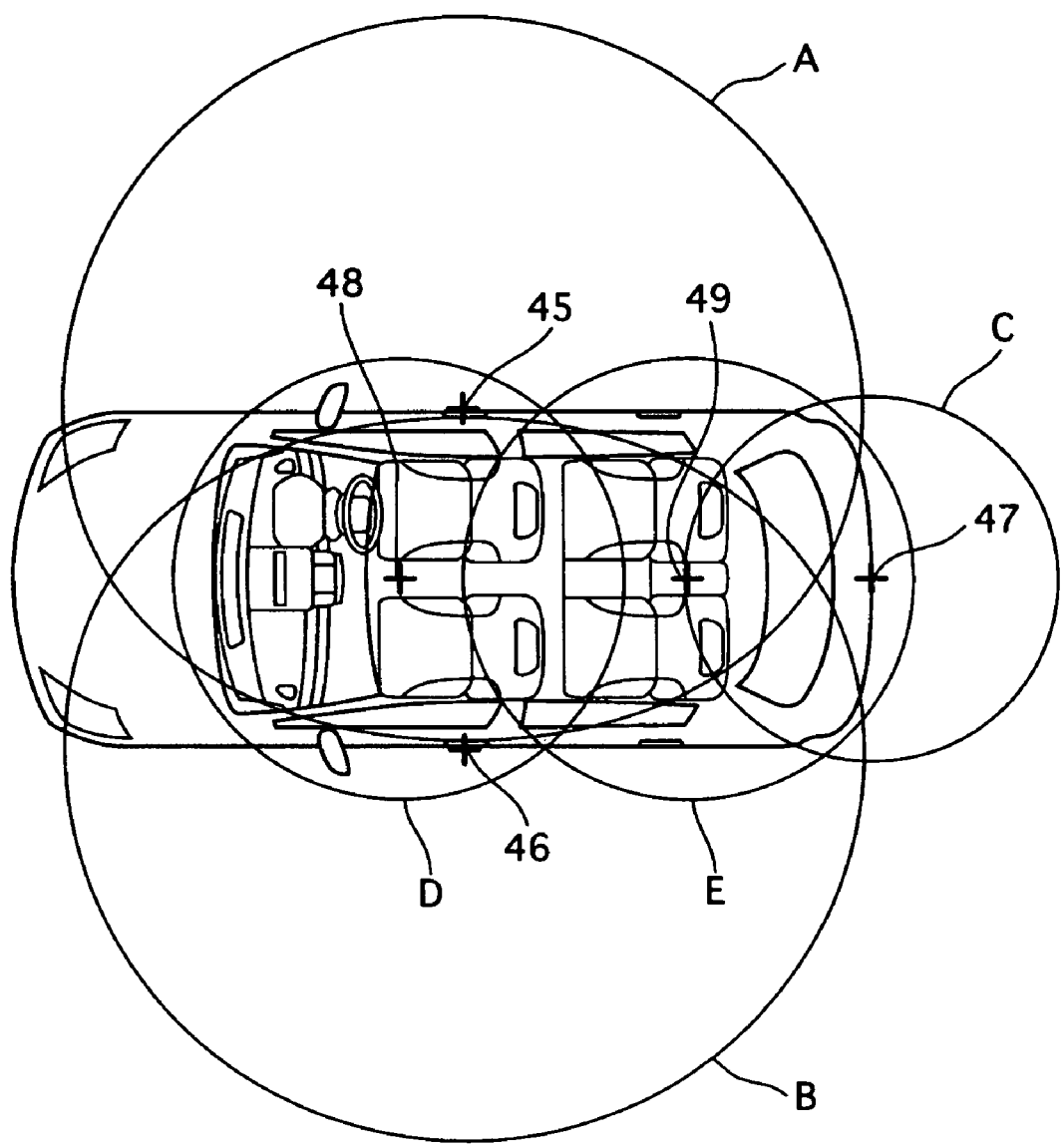
FIG. 2 is a diagram illustrating search areas of search signals of search-signal transmitting antennas that are used in the keyless device of the first embodiment.

FIG. 2 is a diagram illustrating search areas where the portable device 2 can be detected by using the search signals outputted from the vehicle exterior antennas 45 to 47 and the vehicle interior antennas 48 and 49. As shown in FIG. 2, the search area through the vehicle exterior antenna 45 corresponds to an area "A" that covers a right side of the vehicle and the interior of the vehicle. The search area through the vehicle exterior antenna 46 corresponds to an area "B" that covers a left side of the vehicle and the interior. The search area through the vehicle exterior antenna 47 corresponds to an area "C" that covers a rear side of the vehicle and a rear portion of the interior. The search area through the vehicle interior antenna 48 corresponds to an area "D" that mainly covers a front portion of the interior. The search area through the vehicle interior antenna 49 corresponds to an area "E" that mainly covers a rear portion of the interior.

The antenna output parts 38 to 42 are provided with a fault diagnosis function for diagnosing the antennas 45 to 49, so that it outputs the information on the broken-down antenna to the control part 30 via the LF transmitting part 31, in a case where the antenna 45, 46, 47, 48, 49 is judged to be broken down.

Next, the operation of the keyless device of the vehicle of the first embodiment will be described.

<Summary of the Keyless Device>

The keyless device 1 mainly has a door lock function and an engine start function.

The door lock function works in such a way that the doors are locked when the driver with the portable device 2 steps out of the vehicle and walks away therefrom to be out of the search areas where the vehicle exterior antennas 45 to 47 of the on-vehicle device 3 can detect the portable device 2. On the other hand, the doors are unlocked when the driver approaches the vehicle to get in the vehicle and come in the search areas where the vehicle exterior antennas 45 to 47 of the on-vehicle device 3 can detect the portable device 2.

The engine start function works in such a way that the engine starts by operating the not-shown engine start button in a case where the driver with the portable device 2 is in the vehicle and the vehicle interior antennas 48 and 49 detect the portable device 2. On the other hand, the engine does not start, although the engine button is operated, in a case where the driver gets out the vehicle to be out of the search areas where the vehicle interior antennas 48 and 49 can detect the portable device 2.

<A Problem Due to Malfunction of the Vehicle Interior Antenna>

Figure 3:
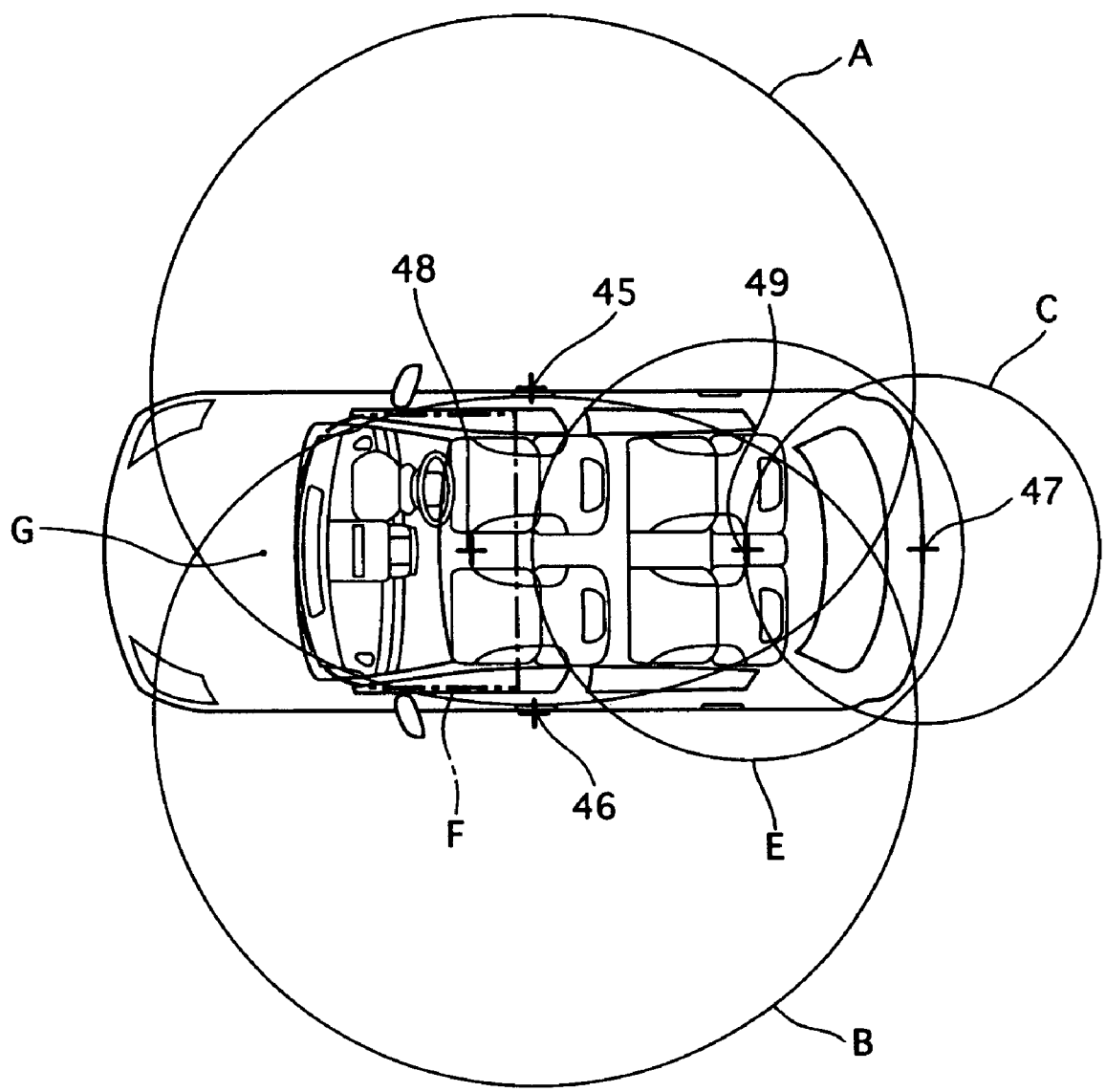
FIG. 3 is a diagram illustrating search areas of search signals of the search-signal transmitting antennas that are used in the keyless device of the first embodiment in a case where the vehicle interior antenna malfunctions.

FIG. 3 is a diagram illustrating the search areas where the portable device 2 can be detected by using the search signals transmitted by the vehicle exterior antennas 45 to 47 and the vehicle interior antenna 49, in a case where the vehicle interior antenna 48 is broken down.

In the case where the vehicle interior antenna 48 is broken down for example, the search areas of the vehicle interior antennas 48 and 49 is limited only to the area "E" covered by using the vehicle interior antenna 49. In other words, the area "F", indicated by an alternate long and short dash line in FIG. 3, deviates from the search areas of the vehicle interior antennas 48 and 49. This causes the vehicle interior antennas 48 and 49 to fail to detect a position of the portable device 2 even when the driver with the portable device 2 is in the vehicle and the portable device 2 is within the area "F".

On the other hand, a most part of an overlapped area, where the search area "A" covered by the vehicle exterior antenna 45 and the area "B" covered by the vehicle exterior antenna 46 are overlapped, corresponds to the passenger compartment. Therefore, it may be assumed that the portable device 2 is in the vehicle when the portable device 2 is detected both in the search area "A" covered by the vehicle exterior antenna 45 and in the search area "B" covered by the vehicle exterior antenna 46. This assumption may allow the antennas 45 and 46 to be used instead of the broken-down vehicle interior antenna 48.

The existence of the portable device 2 in the vehicle, however, cannot be surely judged only by the above-assumption even in the case where it is detected in the overlapped area of the search area "A" of the vehicle exterior antenna 45 and the search area "B" of the vehicle exterior antenna 46, because, in that case, the portable device 2 may be out of the vehicle, for example on a front hood of the vehicle.

In that case, there is a problem in that the engine starts by operating the engine start button although the portable device 2 is out of the passenger compartment.

In order to solve the problem, in the keyless device 1 of the first embodiment, in a case where at least one of the vehicle interior antennas 48 and 49 is broken down, outputs of the search signals, to be transmitted from the vehicle exterior antennas 45 and 46, are controlled to change the search areas "A" and "B" so that the overlapped area thereof covers only the passenger compartment.

<A Control Process of the Keyless Device>

Figure 4:
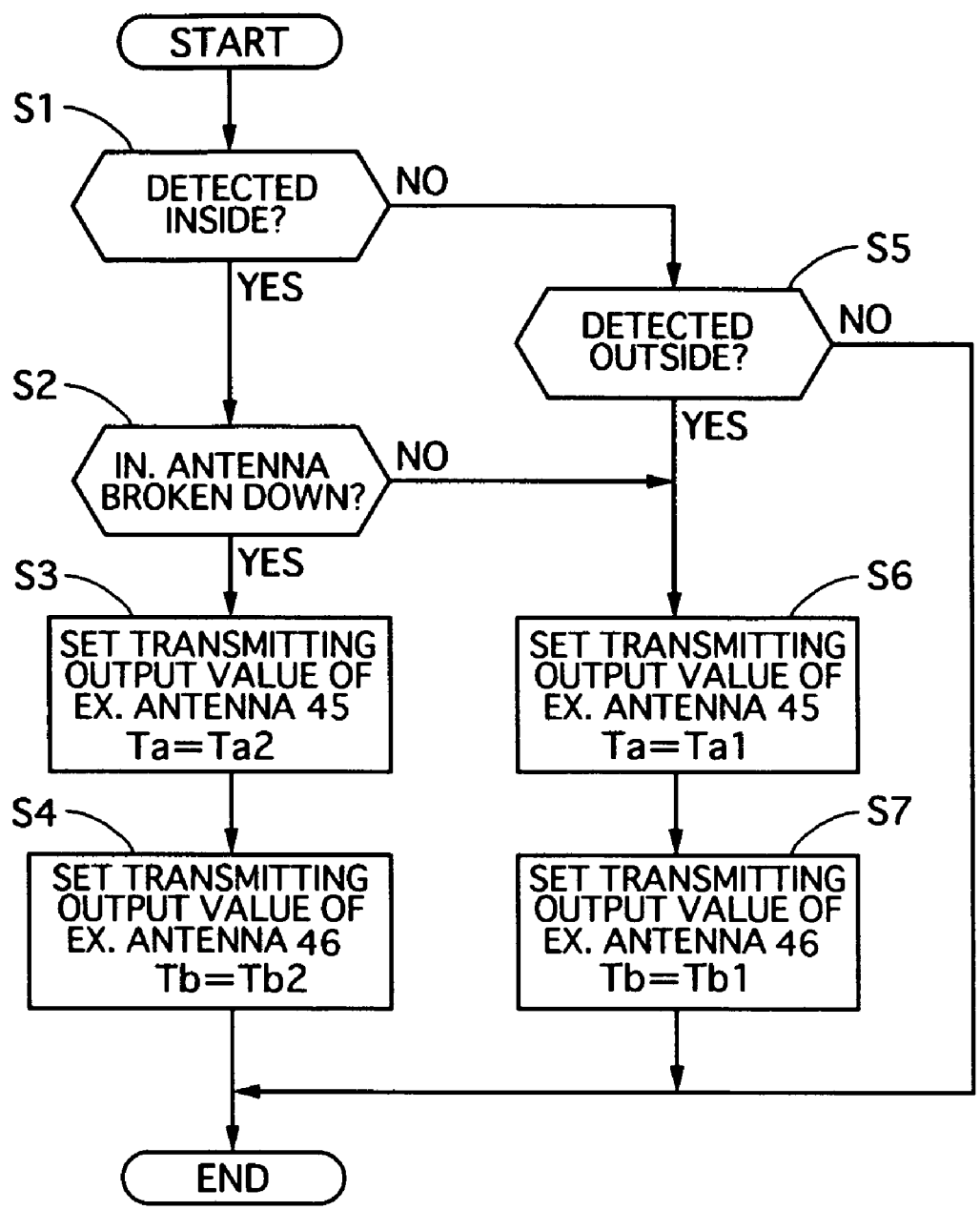
FIG. 4 is a flow chart of a portable-device search process that is carried out by a control part of the on-vehicle device belonged to the first embodiment.

A flow of processes executed by the control part 30 of the on-vehicle device 3 of the first embodiment will be described with reference to a flow chart shown in FIG. 4.

At step S1, the control part 30 judges whether or not the portable device 2 is detected to be in the passenger compartment. In this process, the potable device 2 is judged to be in the passenger compartment only in a case where the on-vehicle device 3 receives the answer signal outputted from the portable device 2 when the portable device 2 replies to both of the search signals transmitted from the vehicle exterior antennas 45 and 46. If the portable device 2 is judged to be in the passenger compartment, the flow goes to step S2, while, if it is judged to be out of the passenger compartment, the flow goes to step S5.

At the step S2, the antenna output parts 41 and 42 judge whether or not the vehicle interior antenna 48 or the vehicle interior antenna 49 is broken down. If the vehicle interior antenna 48 is broken down, the flow goes to step S3, while, if it is not, the flow goes to step S6.

At the step S3, the control part 30 temporally sets a transmitting output value Ta of the vehicle exterior antenna 45 to be an output value Ta2, then the value Ta2 being set back to a normal output value Ta1 after the time sufficient to detect the portable device 2 has passed, and then the flow goes to step S4. Incidentally, the output value Ta2 is smaller than the normal output value Ta1. At the same time, in this step S3, a transmitting output value Tb of the vehicle exterior antenna 46 is maintained to be a normal output value Tb1. Setting of the transmitting output value Ta of the vehicle exterior antenna 45 at the step S3 will be later described.

At the step S4, the control part 30 temporally sets the transmitting output value Tb to be an output value Tb2, then the value Tb2 being set back to the normal output value Tb1 after the time sufficient to detect the portable device 2 has passed, and then the process ends. Incidentally, the output value Tb2 is smaller than the normal output value Tb1. At the same time, in this step S4, the transmitting output value Ta of the vehicle exterior antenna 45 is maintained to be the normal output value Ta1. Setting of the transmitting output value Tb of the vehicle exterior antenna 46 at the step S4 will be later described.

At the step S5, the control part 30 judges whether or not the portable device 2 is out of the passenger compartment. In this process, the portable device 2 is judged to be out of the passenger compartment only in a case where the on-vehicle device 3 receives the answer signal outputted from the portable device 2 when the portable device 2 replies to the search signal transmitted from the vehicle exterior antenna 45 or from the vehicle exterior antenna 46. If the portable device 2 is judged to be out of the passenger compartment, the flow goes to step S6, while, if it is not judged to be out of the passenger compartment, the process ends.

At the step S6, the control part 30 sets the transmitting output value Ta of the vehicle exterior antenna 45 to be the normal output value Ta1, and then the flow goes to step S7.

At the step S7, the control part 30 sets the transmitting output value Tb of the vehicle exterior antenna 46 to be the normal value Tb1, and then the process ends.

<The Operation of Control of the Keyless Device>

The operation of the keyless device 1 of the first embodiment will be described with reference to FIG. 5.

Normally, the transmitting output value Ta of the vehicle exterior antenna 45 is set to be the output value Ta1, the transmitting output value Tb of the vehicle exterior antenna 46 is set to be the output value Tb1, a transmitting output value Tc of the vehicle exterior antenna 47 is set to be an output value Tc1, a transmitting output value Td of the vehicle interior antenna 48 is set to be an output value Td1, and a transmitting output value Te of the vehicle exterior antenna 49 is set to be an output value Te1. In this case, as shown in FIG. 5(*a*), the search area of the vehicle exterior antenna 45 is set on an area "A1", the search area of the vehicle exterior antenna 46 is set on an area "B1", the search area of the vehicle exterior antenna 47 is set on an area "C1", the search area of the vehicle interior antenna 48 is set on an area "D1", and the search area of the vehicle interior antenna 49 is set on an area "E1".

As a result, in a case where the portable device 2 is in the area "F" corresponding to the front portion of the passenger compartment, the control part 30 of the on-vehicle device 3 can recognize that the portable device 2 is in the area "F", by receiving the answer signal outputted from the portable device 2 when the portable device 2 replies to the search signal transmitted from the vehicle interior antenna 48.

Figure 5:
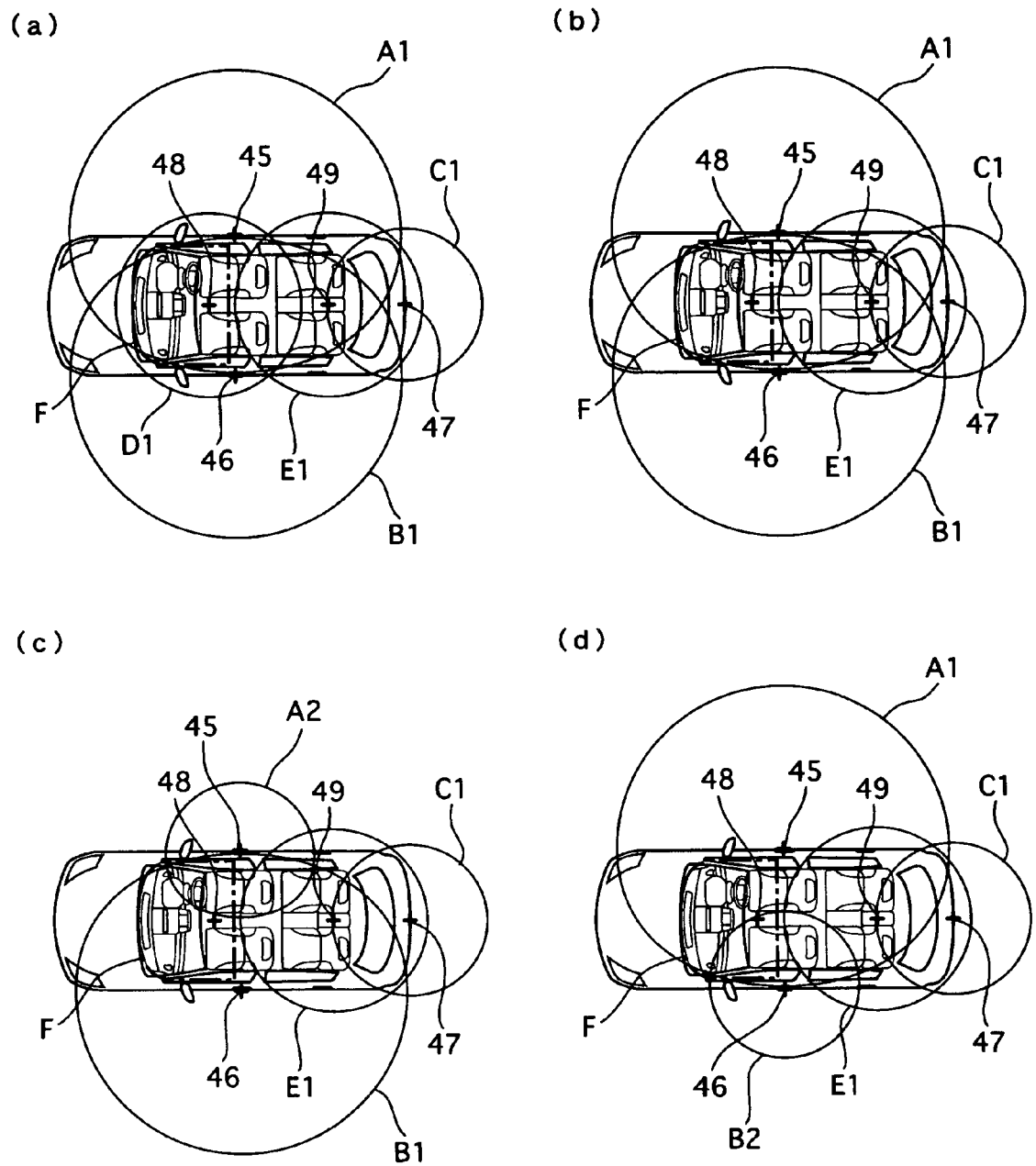
FIG. 5 is a diagram illustrating the operations of the first embodiment, (a) is a diagram illustrating the search areas in a case where every search-signal transmitting antenna is normal, (b) is a diagram illustrating the search areas in a case where one of the vehicle interior antennas is broken down, (c) is a diagram illustrating the search areas in a state where the on-vehicle device detects whether or not the portable device is in a driver side portion of a passenger compartment, and (d) is a diagram illustrating the search areas in a state where on-vehicle device detects whether or not the portable device is in a front-passenger seat side portion of the passenger compartment.

However, if the vehicle interior antenna 48 is broken down for example, the control part 30 of the on-vehicle device 3 cannot receive the answer signal outputted from the portable device 2 when the portable device 2 replies to the search signal transmitted from the vehicle interior antenna 48, even when the portable device 2 is within the area "F", namely the front portion of the passenger compartment, because the vehicle interior antenna 48 does not transmit the search signal, as shown in FIG. 5(*b*). Therefore, the control part 30 cannot recognize that the portable device 2 is within the area "F".

In this case where the vehicle interior antenna 48 is broken down and the portable device 2 is in the area "F" of the front portion of the passenger compartment, the control part 30 receives the answer signal outputted from the portable device 2 when it replies to the search signal transmitted from the vehicle exterior antenna 45 and the answer signal outputted from the portable device 2 when it replies to the search signal transmitted from the vehicle exterior antenna 46, at the same time. Therefore, the control part 30 assumes that the portable device 2 is in the passenger compartment, so that the transmitting outputs of the search signals from the vehicle exterior antennas 45 and 46 are controlled as explained below to change so as to search the position of the portable device 2.

First, as shown in FIG. 5(*c*), the control part 30 decreases the transmitting output value Ta of the vehicle exterior antenna 45 to change from the normal output value Ta1 to the output value Ta2. The output value Ta2 is set to be a value so that the overlapped area of the search area "A2" of the vehicle exterior antenna 45 and the search area "B1" of the vehicle exterior antenna 46 does not contain the exterior of the vehicle. The control part 30 sets back the transmitting output value Ta of the vehicle exterior antenna 45 to the normal output value Ta1 after time, sufficient to receive the answer signal outputted from the portable device 2 or to transmit the answer signal, has passed.

Next, as shown in FIG. 5(*d*), the control part 30 decreases the transmitting output value Tb of the vehicle exterior antenna 46 to change from the normal output value Tb1 to the output value Tb2. The output value Tb2 set to be a value so that the overlapped area of the search area "B2" of the vehicle exterior antenna 46 and the search area "A1" of the vehicle exterior antenna 45 does not contain the exterior of the vehicle. The control part 30 sets back the transmitting output value Tb of the vehicle exterior antenna 46 to the normal output value Tb1 after time, sufficient to receive the answer signal outputted from the portable device 2 or to transmit the answer signal, has passed.

That is, in the keyless device 1 of the first embodiment, first, the transmitting output of the vehicle exterior antenna 45, which is located at a right side (a driver's seat side) of the vehicle, is decreased so that the search area "A" of the vehicle exterior antenna 45 is changed to the search area "A2" that is smaller than the normal search area "A1" so that the overlapped area of the search area "A2" of the vehicle exterior antenna 45 and the search are "B1" of the vehicle exterior antenna 46 corresponds to an area of the driver's seat and its periphery.

Therefore, in the case where the vehicle interior antenna 48 is broken down, the portable device 2 can be detected by using the search signals transmitted from the vehicle exterior antennas 45 and 46 when it is in the passenger compartment.

Then, as shown in FIG. 5(*d*), the transmitting output of the vehicle exterior antenna 46, which is located at a left side (a front passenger seat side) of the vehicle, is decreased so that the search area "B" of the vehicle exterior antenna 46 is changed to the search area "B2" that is smaller than the normal search area "B1" so that the overlapped area, of the search area "B2" of the vehicle exterior antenna 46 and the search are "A1" of the vehicle exterior antenna 45, corresponds to an area of the front passenger seat and its periphery.

Therefore, in the case where the vehicle interior antenna 48 is broken down, the portable device 2 can be detected by using the search signals transmitted from the vehicle exterior antennas 45 and 46 when it is in the passenger compartment.

The order of searching the portable device 2 is set based on the consideration in that normally a driver is very likely to ride the vehicle with the portable device 2. The control part 30 can recognize the position of the portable device 2 earlier by searching the portable device 2 in the driver's seat and its periphery first.

Accordingly, the engine can start by operating the engine start button when the portable device 2 is in the passenger compartment even in the case where the vehicle exterior antenna 48 is broke down. On the other hand, the engine is prevented from starting by operating the engine start button when the portable device 2 is out of the passenger compartment.

In the first embodiment, the search areas of the vehicle exterior antennas 45 and 46 are variably controlled by changing the transmitting output values of the vehicle exterior antennas 45 and 46, so that the portable device 2 in the passenger compartment can be detected by the search signals of the vehicle exterior antennas 45 and 46 without an additional device/part.

Further, each antenna output part 38 to 42 has the fault diagnosis function of each antenna 45 to 49. The overlapped area of the search area "A" of the vehicle exterior antenna 45 and the search area "B" of the vehicle exterior antenna 46 is set to correspond to only the passenger compartment, in the case where the vehicle interior antenna 48 is broken down. Accordingly, in the case where the vehicle exterior antenna 48 is not broken down, the search area "A" of the vehicle exterior antenna 45 and the search area "B" of the vehicle antenna 46 do not need to be narrowed beyond necessity.

Next, the effects of the keyless device 1 of the first embodiment will be described.

(1) The keyless device of the first embodiment has the on-vehicle device 3 that is provided with the vehicle exterior antennas 45 to 47 (corresponding to the search signal transmitting means) and the answer signal receiving antenna 44

(corresponding to the answer signal receiving means), where the antennas 45 to 47 transmit the search signals for searching the position of the portable device 2 to the interior and the exterior of the vehicle, and the answer signal receiving antenna 44 receives the answer signal outputted from the portable device 2 when it replies to the search signal. The keyless device further has the portable device 2 that is provided with the search signal receiving coil 25 (corresponding to the search signal receiving means) that receives the search signal, and the answer signal transmitting antenna 23 (corresponding to the answer signal transmitting means) that transmits the answer signal. The control part 30 (corresponding to the position detecting means) detects whether or not the portable device 2 is within the search areas "A" to "C" where the vehicle exterior antennas 45 to 47 can detect the portable device 2. In addition, the control device 30 sets the search areas "A" and "B" in such a way that the search area "A" of the vehicle exterior antenna 45 and the search area "B" of the vehicle exterior antenna 46 do are different in area from each other and that the overlapped area of the search areas "A" and "B" is located only in the passenger compartment.

Therefore, the portable device 2 can be detected to be in the passenger compartment by using the search signals outputted from the vehicle exterior antennas 45 and 46 in the case where the vehicle interior antenna 48 is broken down. As a result, in the case where the portable device 2 in the passenger compartment, the engine can be started by operating the engine start button, while, in the case where it is out of the passenger compartment, the engine can be prevented from being stated even when the engine start button is operated.

(2) The control part 30 changes the outputs of the vehicle exterior antennas 45 and 46 to set the search areas "A" and "B". Therefore, as shown in FIG. 5(c), first, the transmitting output of the vehicle exterior antenna 45, which is provided at the right side (the driver's seat side) of the vehicle, is decreased so that the overlapped area of the search area "A2" of the vehicle exterior antenna 45 and the search area "B1" of the vehicle antenna 46 corresponds to the area of the driver's side and its periphery. Then, as shown in FIG. 5(d), the transmitting output of the vehicle exterior antenna 46, which is provided at the left side (the front passenger seat side), is decreased so that the overlapped area of the search area "B2" of the vehicle exterior antenna 46 and the search area "A1" of the vehicle antenna 45 corresponds to the area of the front passenger seat side and its periphery.

Therefore, the keyless device 1 can detect the portable device 2 in the passenger compartment by using the search signals of the vehicle exterior antennas 45 and 46 without an additional portion/part.

(3) Each antenna output part 38 and 42 has the fault diagnosis function for diagnosing the fault of each antenna 45 to 49. The control part 30 changes the search areas "A" and "B" of the vehicle exterior antennas 45 and 46 in the case where the vehicle interior antenna 48 is judged to be broken down. Therefore, in the case where the vehicle exterior antenna 48 is not broken down, the search area "A" of the vehicle exterior antenna 45 and the search area "B" of the vehicle antenna 46 do not need to be narrowed beyond necessity.

[Second Embodiment]

Next, a second embodiment according to the present invention will be described.

In the first embodiment, the transmitting output values of the vehicle exterior antennas 45 and 46 are controlled to change their search areas "A" and "B". On the other hand, in the second embodiment, there is a difference from the first embodiment in that the transmitting output values of the vehicle exterior antennas 45 and 46 are maintained to be constant ones, and the search areas "A" and "B" are changed according to receiving intensities when the portable device 2 receives the search signals of the vehicle exterior antennas 45 and 46.

First, a construction of the keyless device of the second embodiment will be described.

The construction of the keyless device 1 of the second embodiment is constructed similarly to the first embodiment, except that a part of functions of the portable device 2 is different from those of the first embodiment. The similar portions/parts of the first embodiment are indicated by the same reference numbers as the first embodiment, and their explanations are omitted.

<Portable Device>

The portable device 2 mainly has a control part 21, an RF transmitting part 22, an answer signal transmitting antenna 23, an LF receiving part 24 and a search signal receiving coil 25, similarly to those of the first embodiment.

The control part 21 judges whether or not the receiving intensities of search signals processed by the LF receiving part 24 are equal to or higher than threshold values, respectively. If they are equal to or higher than the threshold values, the control part 21 outputs a command signal to the RF transmitting part 22 so that the part 22 transmits an answer signal. The threshold values may be differently set for search signals outputted from the transmitting antennas 38 to 42 of the on-vehicle device 3. The portable device 2 stores an ID code that identifies its corresponding vehicle from other vehicles, and the control part 21 outputs the ID code to the RF transmitting part 22 after the search signal is processed by the LF receiving part 24 and the control device 21 judges the information of the search signals to be coincident with the ID code stored in the portable device 2. In addition, the control part 21 judges which of the search signal transmitting antennas 45 to 49 transmits the search signal, and then it outputs the information on the search signal transmitting antenna that has transmitted the search signal to the RF transmitting part 22. In addition, the control part 21 determines the receiving intensity of the search signal, and then it outputs the information on the receiving intensity to the RF transmitting part 22.

<Control Process of the Keyless Device>

Figure 6:
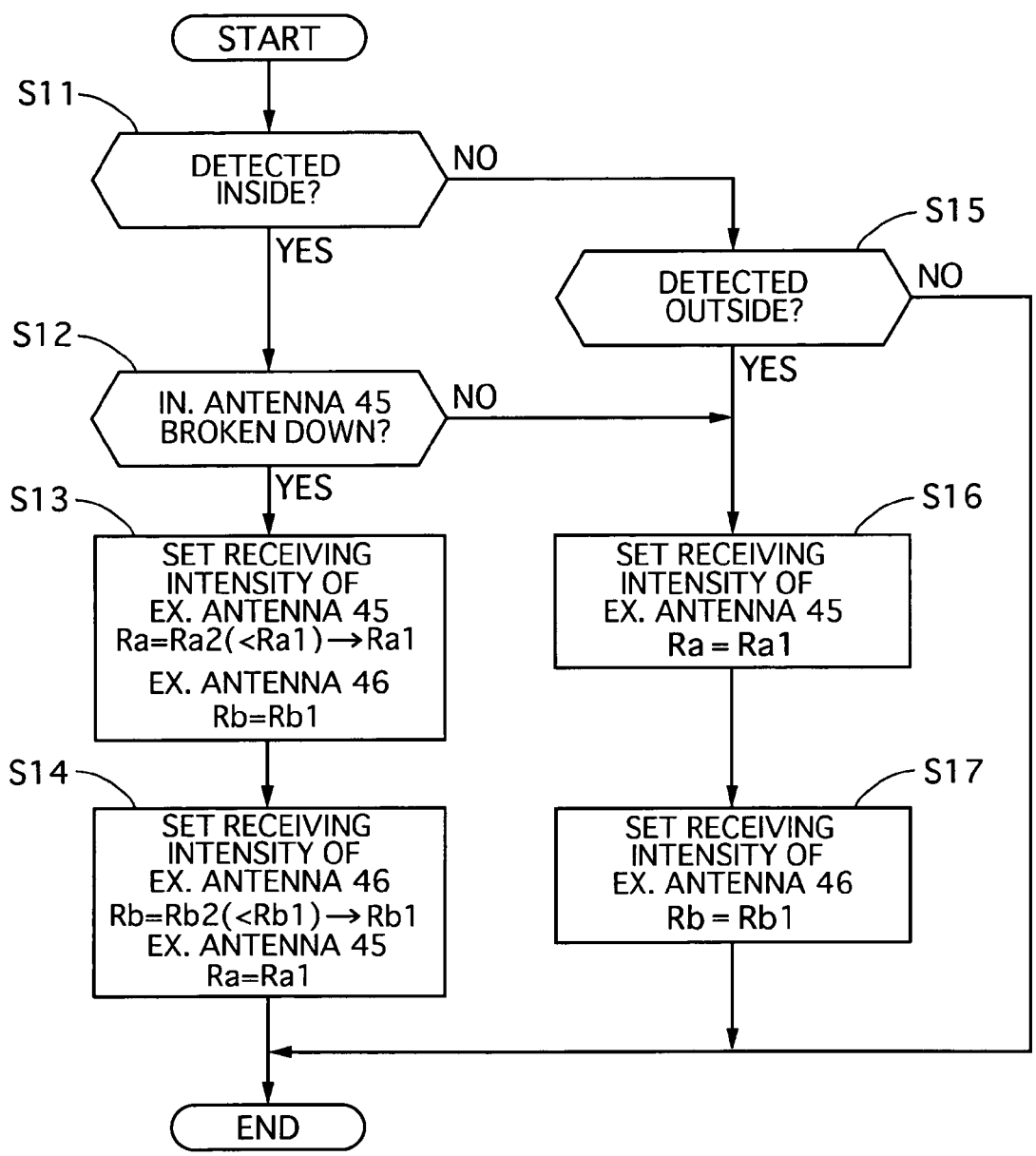
FIG. 6 is a flow chart of a portable-device search process that is carried out by a control part of a keyless device of a second embodiment according to the present invention.

A flow of processes executed by the control part 30 of the on-vehicle device 3 of the second embodiment will be described with reference to a flow chart shown in FIG. 6.

At step S11, the control part 30 judges whether or not the portable device 2 is in the passenger compartment. The portable device 2 is judged to be in the passenger compartment when the on-vehicle device 3 receives both of the answer signals outputted from the portable device 2 when it replies both of the search signals outputted from the vehicle exterior antennas 45 and 46. If the portable device 2 is judged to be in the passenger compartment, the flow goes to step S12, while, if it is judged to be out of the passenger compartment, the flow goes to step S15.

At the step S12, the control part 30 judges whether or not the vehicle interior antenna 48 or the vehicle interior antenna 49 is broken down. If the vehicle interior antenna 48 is broken down, the flow goes to step S13, while, if it is not, the flow goes to step S16.

At the step S13, the control part 30 temporally sets a receiving intensity threshold value Ra of the search signal outputted from the vehicle exterior antenna 45 to change from a normal threshold value Ra1 to an abnormal threshold value Ra2. Then, it sets back the abnormal threshold value Ra2 to the normal threshold value Ra1 after the time sufficient to detect the portable device 2 has passed. The abnormal threshold value Ra2 is set to be smaller than the normal threshold value Ra1. Then the flow goes to step S14. Incidentally, at the step S13, the receiving intensity threshold value Rb of the search signal outputted from the vehicle exterior antenna 46 is maintained to be the normal threshold value Rb1.

At the step S14, the control part 30 temporally sets the receiving intensity threshold value Rb of the search signal outputted from the vehicle exterior antenna 46 to change the normal threshold value Rb1 to the abnormal threshold value Rb2. Then, it sets back the abnormal threshold value Rb2 to the normal threshold value Rb1 after the time sufficient to detect the portable device 2 has passed. The abnormal threshold value Rb2 is set to be smaller than the normal threshold value Rb1. Incidentally, at the step S14, the receiving intensity threshold value Ra of the search signal outputted from the vehicle exterior antenna 45 is maintained to be the normal threshold value Ra1.

At the step S15, the control part 30 judges whether or not the portable device 2 is out of the passenger compartment. The portable device 2 is judged to be out of the passenger compartment only in the case where the on-vehicle device 3 receives the answer signals outputted from the portable device 2 when the portable device 2 replies to the search signal transmitted from the vehicle exterior antennas 45 or from the vehicle exterior antenna 46. If the portable device 2 is judged to be out of the passenger compartment, the flow goes to step S16, while, if it is not judged to be out of the passenger compartment, the process ends.

At the step S16, the control part 30 sets the receiving intensity threshold value Ra of the search signal outputted from the vehicle exterior antenna 45 to be the normal threshold value Ra1, and then the flow goes to step S17.

At the step S17, the control part 30 sets the receiving intensity threshold value Ra of the search signal outputted from the vehicle exterior antenna 46 to be the normal threshold value Rb1, and then the process ends.

In the keyless device of the second embodiment, the control part 30 controls the receiving intensity threshold values Ra and Rb of the search signals outputted from the vehicle exterior antennas 45 and 46. The abnormal threshold value Ra2, which is set for the receiving intensity threshold value of the search signal outputted from the vehicle exterior antenna 45, is set in such a way that the portable device 2 transmits the answer signal in a case where the portable device 2 is within the area A2 shown in FIG. 5. Similarly, the abnormal threshold value Rb2, which is set for the receiving intensity threshold value of the search signal outputted from the vehicle exterior antenna 46, is set in such a way that the portable device 2 transmits the answer signal in a case where the portable device 2 is within the area B2 shown in FIG. 5. That is, similarly to the first embodiment, the search areas "A" and "B" of the vehicle exterior antennas 45 and 46 are changed.

Accordingly, the search areas "A" and "B" of the vehicle exterior antennas 45 and 46 can be changed, the transmitting outputs thereof being maintained to be normal.

(4) The answer signal transmitting antenna 23 outputs the answer signal when the receiving intensity of the search signal that is received by the search signal receiving coil 25 is larger than the threshold value. In addition, the control part 3o changes the threshold values to set the search areas "A" and "B". Therefore, the search areas "A" and "B" of the vehicle exterior antennas 45 and 46 can be changed, the transmitting outputs thereof being maintained to be normal.

[The Other Embodiments]

While the keyless device of the present invention has been explained based on the first and second embodiments, its concrete construction is not limited to these embodiments, and its design changes and modifications are contained in the present invention as long as they do not deviate from the scope of the present invention.

For example, Although the examples describe the cases where the vehicle interior antennas 48, which is provided at the front portion of the passenger compartment, is broken down in the first and second embodiments, the similar method may be applied in a case where the vehicle interior antenna 49 that is provided at the rear portion of the passenger compartment is broken down.

In addition, in the keyless device of the second embodiment, the control device 21 of the portable device 2 judges whether the receiving intensity of the search signal processed by the LF receiving part 24 is equal to or larger than the threshold value. If it is YES, the control part 21 may output the command signal to the RF transmitting part 22 so that the transmitting part 22 transmits the answer signal containing the information on the receiving intensity of the search signal, and the control part 30 may process in such a way that there is no answer signal from the portable device 2 in a case where the receiving intensity of the search signal contained in the answer signal is smaller than the threshold value. Thus, a communication between the portable device 2 and the on-vehicle device 3 can be stably established for a long time.

The invention claimed is:

1. A keyless device for a vehicle, comprising:
an on-vehicle device and a portable device, the on-vehicle device having a plurality of search signal transmitting means that each transmits a search signal to an interior and an exterior of the vehicle to search for the portable device, and with an answer signal receiving means that receives an answer signal from the portable device in reply to the search signal,
the portable device having a search signal receiving means for receiving the search signal and an answer signal transmitting means for transmitting the answer signal based on the search signal;
a position detecting means for detecting based on the answer signal that the portable device is within a search area where the search signal transmitting means searches for the portable device; and
a search area setting means for setting search areas in such a way that a first search area of a first search signal transmitting means and a second search area of a second search signal transmitting means differ from each other and differ in area size, and an overlapped area of the first and second search areas corresponds only to the interior of the vehicle,
wherein the search area setting means changes outputs of the first and the second search signal transmitting means to set the first search area and the second search area, and
during a time that both the first search signal transmitting means and the second search signal transmitting means are transmitting the search signals, the search signal transmitted by the first search signal transmitting means searches the left side of the vehicle while the search signal transmitted by the second search signal transmitting means searches the right side of the vehicle.

2. The keyless device according to claim 1, wherein
the answer signal transmitting means transmits the answer signal in a case where a receiving intensity of the search signal received by the search signal receiving means is larger than a threshold value, and
the search area setting means changes threshold values to set the first search area and the second search area.

3. The keyless device according to claim 2, wherein
the on-vehicle device further includes a vehicle interior search signal transmitting means that transmits the search signal for searching a position of the portable device, and a fault diagnosis function for the vehicle interior search signal transmitting means, and wherein
the search area setting means is activated in a case where the vehicle interior search signal transmitting means is diagnosed to be broken.

4. The keyless device according to claim 1, wherein
the on-vehicle device further includes a vehicle interior search signal transmitting means that transmits the search signal for searching a position of the portable device, and a fault diagnosis function for the vehicle interior search signal transmitting means, and wherein
the search area setting means is activated in a case where the vehicle interior search signal transmitting means is diagnosed to be broken.

5. A keyless device for a vehicle, comprising:
an on-vehicle device and a portable device, the on-vehicle device having a plurality of search signal transmitting means that each transmits a search signal to an interior and an exterior of the vehicle to search for the portable device, and with an answer signal receiving means that receives an answer signal from the portable device in reply to the search signal,
the portable device having a search signal receiving means for receiving the search signal and an answer signal transmitting means for transmitting the answer signal based on the search signal;
a position detecting means for detecting based on the answer signal that the portable device is within a search area where the search signal transmitting means searches for the portable device; and
a search area setting means for setting search areas in such a way that a first search area of a first search signal transmitting means and a second search area of a second search signal transmitting means differ from each other and differ in area size, and an overlapped area of the first and second search areas corresponds only to the interior of the vehicle,
wherein the answer signal transmitting means transmits the answer signal in a case where a receiving intensity of the search signal received by the search signal receiving means is larger than a threshold value,
the search area setting means changes threshold values to set the first search area and the second search area, and
during a time that both the first search signal transmitting means and the second search signal transmitting means are transmitting the search signals, the search signal transmitted by the first search signal transmitting means searches the left side of the vehicle while the search signal transmitted by the second search signal transmitting means searches the right side of the vehicle.

6. The keyless device according to claim 5, wherein
the on-vehicle device further includes a vehicle interior search signal transmitting means that transmits the search signal for searching a position of the portable device, and a fault diagnosis function for the vehicle interior search signal transmitting means, and wherein
the search area setting means is activated in a case where the vehicle interior search signal transmitting means is diagnosed to be broken.

\* \* \* \* \*